United States Patent
Tabushi

(10) Patent No.: US 11,386,309 B2
(45) Date of Patent: Jul. 12, 2022

(54) PRINTING APPARATUS, PRINTING METHOD, AND NON-TRANSITORY COMPUTER-READABLE RECORDING MEDIUM THEREFOR

(71) Applicant: Brother Kogyo Kabushiki Kaisha, Nagoya (JP)

(72) Inventor: Chika Tabushi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/130,000

(22) Filed: Dec. 22, 2020

(65) Prior Publication Data

US 2021/0303945 A1 Sep. 30, 2021

(30) Foreign Application Priority Data

Mar. 31, 2020 (JP) .............................. JP2020-063813

(51) Int. Cl.
*G06K 15/02* (2006.01)
*G06F 3/12* (2006.01)

(52) U.S. Cl.
CPC ..... *G06K 15/1822* (2013.01); *G06K 15/1802* (2013.01); *G06K 15/1836* (2013.01)

(58) Field of Classification Search
None
See application file for complete search history.

(56) References Cited

U.S. PATENT DOCUMENTS

| | | |
|---|---|---|
| 2004/0125107 A1 | 7/2004 | McCully |
| 2004/0125108 A1 | 7/2004 | McCully |
| 2005/0198566 A1* | 9/2005 | Takamine ............. G06F 3/1286 715/255 |
| 2008/0144062 A1* | 6/2008 | Nakatsuka ............ G06F 40/189 358/1.11 |
| 2009/0097750 A1 | 4/2009 | Tamaru |
| 2011/0063671 A1 | 3/2011 | Akahane |
| 2012/0002226 A1* | 1/2012 | Zhan ..................... G06F 3/1284 358/1.11 |
| 2015/0077772 A1* | 3/2015 | Satou ................. G06K 15/1825 358/1.11 |
| 2015/0278658 A1* | 10/2015 | Hara ...................... G06K 9/342 358/1.9 |
| 2021/0019366 A1* | 1/2021 | Markey .................. G06F 16/93 |

FOREIGN PATENT DOCUMENTS

| | | | |
|---|---|---|---|
| JP | 05281946 | * 10/1993 | ............... G09G 5/24 |
| JP | 2004-192236 A | 7/2004 | |
| JP | 2004-213607 A | 7/2004 | |
| JP | 2009-100232 A | 5/2009 | |
| JP | 2014-056583 A | 3/2014 | |

* cited by examiner

*Primary Examiner* — Beniyam Menberu
(74) *Attorney, Agent, or Firm* — Burr & Brown, PLLC

(57) ABSTRACT

In a printing apparatus provided with a controller configured to perform a RIP process, when a fixed-width font is determined to be used as a substitute font for a target character to be printed and when a glyph width of the target character is smaller than a fixed width, and a glyph width of the target character is larger than a width of a bounding box of the glyph of the target character expressed by the fixed-width font, the controller is configured to arrange, in the RIP process, the target character expressed by the fixed-width font such that the width of the bounding box is arranged within the glyph width.

18 Claims, 8 Drawing Sheets

US 11,386,309 B2

PRINTING APPARATUS, PRINTING METHOD, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-063813 filed on Mar. 31, 2020. The entire subject matter of the application is incorporated herein by reference.

BACKGROUND

Technical Field

The present disclosures relate to a printing apparatus configured to create raster data using fonts stored in the printing apparatus when printing is performed based on print data described in a page-description language. The present disclosures also relate to a printing method applicable to such a printing apparatus and a non-transitory computer-readable recording medium storing instructions realizing such a method.

Related Art

The print data described in the page-description language includes various information such as drawing information of graphics, font information for characters, printing position information for characters and glyph width information which indicates a width from an origin of a character to the origin of a next character for each character. In addition, the print data also includes commands. Typically, the printing apparatus employs a RIP (Raster Image Processor) which is configured to analyze the commands included in the print data and create the raster data. The printing apparatus then prints images based on the thus created raster data. In the following description, the processes performed by the RIP will be referred to as a RIP process.

SUMMARY

The printing apparatus generally stores font information therein. When the print data does not include font information for characters, the printing apparatus selects one of the fonts the printing apparatus stores as a substitute font and creates the raster data such that each character in the substitute font is arranged within a glyph width which is designated and assigned to the character by the print data. In particular, when the glyph width for the character of the substitute font is larger than a glyph width designated and assigned to the character by the print data, the printing apparatus creates the raster data by reducing a size of the character expressed by the substitute font such that the glyph width of the substitute font is arranged within the glyph width designated by the print data.

As one example of the font, there has been known a fixed-width font which has a fixed width for any character. In the fixed-width font, the glyph width for the character having a relatively small width such as "I" has the same glyph width for the character having a relatively larger width such as "W" by adding blank spaces around the glyph having the small width.

In the above-described conventional printing apparatus, when the fixed-width font is selected as the substitute font and the glyph width for the character "I" expressed by the fixed-width font is wider than the glyph width designated by the print data, the glyph width expressed by the fixed-width font for the character "I" is reduced so that the glyph width expressed by the fixed-width font for the character "I" is equal to or less than the glyph width designated by the print data. In such a case, the character "I" itself is excessively reduced due to the blank spaces added around the character "I" and printed onto a printing sheet in an unnatural shape.

According to aspects of the present disclosures, there is provided a printing apparatus which is provided with a controller configured to perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data, a printing device configured to print an image based on the raster data, and a storage device configured to store fixed-width font information in which a fixed width is assigned to each character. When the fixed-width font is determined to be used as a substitute font for the target character and when the glyph width of the target character is smaller than the fixed width and the glyph width of the target character is larger than the width of the bounding box of the glyph of the target character expressed by the fixed-width font, the controller is further configured to arrange, in the RIP process, the target character expressed by the fixed-width font such that the width of the bounding box is arranged within the glyph width.

According to aspects of the present disclosures, there is provided a printing apparatus, provided with a controller configured to perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data, a printing device configured to print an image based on the raster data, and a storage device configured to store fixed-width font information in which a fixed width is assigned to each character and a proportional font in which different widths are assigned to respective characters. When one of the fixed-width font and the proportional font is determined to be used as a substitute font for the target character, the controller is further configured to perform, in the RIP process, when the glyph width of the target character is equal to a width of the target character expressed by the determined one of the fixed-width font and the proportional font, arranging the target character expressed by the determined one of the fixed-width font and the proportional font so that the width of the target character expressed by the determined one of the fixed-width font and the proportional font coincides with the glyph width, when the glyph width of the target character is larger than the width of the target character expressed by the determined one of the fixed-width font and the proportional font, arrange the target character expressed by the determined one of the fixed-width font and the proportional font such that the width of the target character expressed by the determined one of the fixed-width font and the proportional font is within the glyph width, when the glyph width of the target character is smaller than the width of the target character expressed by the determined one of the fixed-width font and the proportional font, and the determined one of the fixed-width font and the proportional font is the proportional font, arranging the target character expressed by the proportional font by reducing so that a reduced width of the target character expressed by the proportional font is within the glyph width, when the glyph width of the target character is smaller than the width of the target character expressed by the determined one of the fixed-width font and the proportional font, the determined one of the fixed-width font and the proportional font is the fixed-width font, and the glyph width of the target character is equal to or smaller than a width of a bounding box of the glyph of the target character expressed in the fixed-width font, arranging the target character expressed by the fixed-width font so that the fixed width of the target character coincides with the glyph width, and when the glyph width of the target character is smaller than the width of the target character expressed by the determined one of the fixed-width font and the proportional font, the determined one of the fixed-width font and the proportional font is the fixed-width font, and the glyph width of the target character is larger than the width of the bounding box of the glyph of the target character expressed in the fixed-width font, arranging the target character expressed by the fixed-width font so that the width of the bounding box is within the glyph width.

According to aspects of the present disclosures, there is provided a printing method, which includes performing a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data, and printing an image based on the raster data. When a fixed-width font is determined to be used as a substitute font for the target character and when the glyph width of the target character is smaller than the fixed width and the glyph width of the target character is larger than the width of the bounding box of the glyph of the target character expressed by the fixed-width font, the method further comprises arranging the target character expressed by the fixed-width font such that the width of the bounding box is arranged within the glyph width.

According to aspects of the present disclosures, there is provided a non-transitory computer-readable recording medium for a printing apparatus having a controller, the recording medium storing computer-executable instructions which cause, when executed by the controller, the printing apparatus to perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data, and print an image based on the raster data. When a fixed-width font is determined to be used as a substitute font for the target character and when the glyph width of the target character is smaller than the fixed width and the glyph width of the target character is larger than the width of the bounding box of the glyph of the target character expressed by the fixed-width font, the instructions further causes, when executed by the controller, the printing apparatus to arrange the target character expressed by the fixed-width font such that the width of the bounding box is arranged within the glyph width.

DETAILED DESCRIPTION OF THE EMBODIMENT

Hereinafter, referring to the accompanying drawings, an embodiment according to aspects of the present disclosures will be described.

1. Schematic Configuration of Printer

Figure 1:
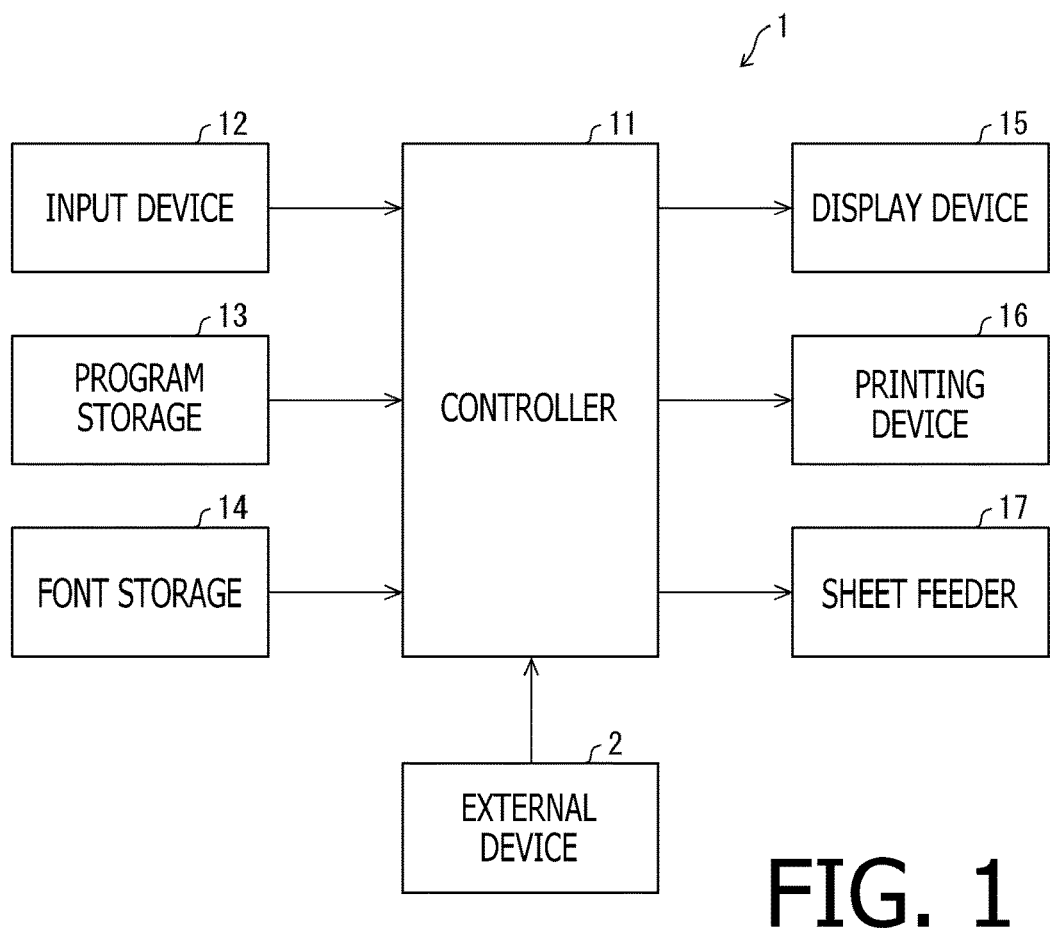
FIG. 1 is a block diagram illustrating a brief configuration of a printer according to an embodiment of the present disclosures.

FIG. 1 is a block diagram illustrating a schematic configuration of a printer 1. The printer 1 is an example of a printing apparatus according to aspects of the present disclosures.

As shown in FIG. 1, the printer 1 is connected to an external device 2. The printer 1 is configured to print images on a printing sheet based on an instruction from the external device 2. One example of the external device 2 is a host computer.

The printer 1 includes a controller 11, an input device 12, a program storage 13, a font storage 14, a display device 15, a printing device 16, and a sheet feeder 17.

The input device 12 is configured to receive, from a user, various instructions directed to the printer 1. The program storage 13 is configured to store control programs executed by the controller 11. The font storage 14 is configured to store substitute fonts used by the printer 1. A fixed-width font and a proportional font are available as the substitute fonts. The display device 15 is configured to display various screens under control of the controller 11. the printing device 16 is configured to print characters and/or images based on print data and instructions received from the external device 2, on the printing sheet supplied from the sheet feeder 17. The sheet feeder 17 is configured to supply the printing sheets one by one to the printing device 16.

According to the present disclosures, the print data has a PDF file format. In the PDF data, images are described according to a page-description language based on PostScript®. The page-description language does not need to be limited to the PostScript, but PCL® or LIPS® can also be used as the page-description language.

In the print data, a plurality of operators for drawing character strings, graphics and/or images are described in order of processing. The operators indicate, for example, a font assignment, a glyph which represents a character shape, a drawing position of the glyph, a glyph size and the like. The controller 11 is configured to analyze the operator to determine a glyph width, which represents a distance between two adjacent glyph origins (see FIG. 2). In other words, the glyph width is equal to a width of a body corresponding to the character "g" in a certain font.

Bounding Box, Bounding Box Width, and Glyph Width

Figure 2:
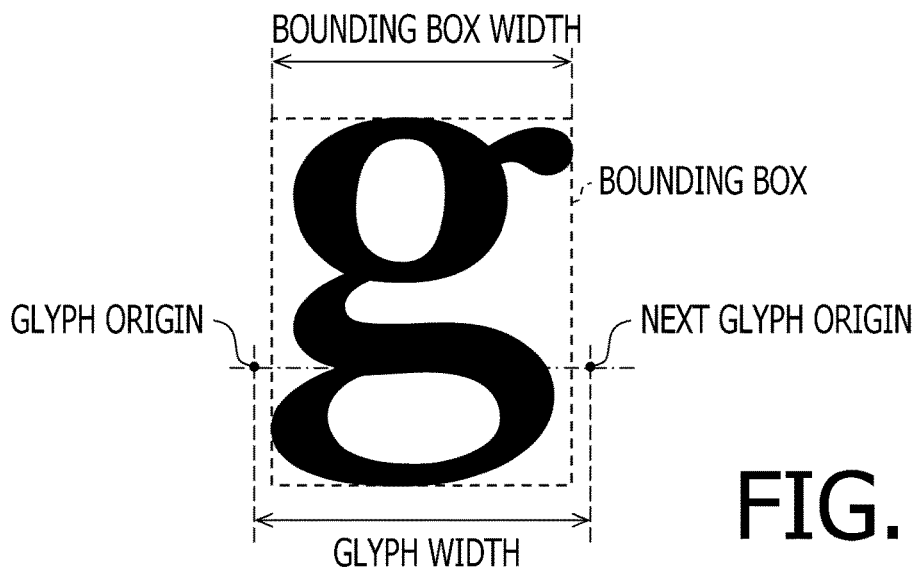
FIG. 2 illustrates definitions of a bounding box, a bounding box width, and a glyph width.

Referring to FIG. 2, a bounding box of the glyph, a bounding box width of the glyph, and the glyph width will be described using a lower-case alphabet "g" as an example of the glyph. It is noted that a graphical representation of the lower-case "g" is the glyph, and a rectangle externally contacts the glyph "g" is a bounding box of the glyph. A width of the bounding box is referred to as a bounding box width. The glyph width is a distance between the glyph origin of the glyph of interest and a next glyph origin, which is the glyph origin of a glyph next to the glyph of interest (i.e., "g"). It is noted that the bounding box width represents a width of a character, while the glyph width defines a width of an area of the character and is slightly wider than the bounding box width.

The printer 1 performs the RIP process in which the PDF data is converted to the raster data. The RIP process includes an analyzing process in which the multiple operators in the PDF data are analyzed successively, a creating process in which drawing objects obtained in the analyzing process such as character strings, graphics and/or images are successively arranged in an image space for one page, and a writing process in which the one page of image created in the creating process is written in a storage (not shown) as the raster data. The printer 1 is configured to print an image represented by the raster data created in the RIP process on the printing sheet with use of the printing device 16.

The operators regarding the drawing of the glyph of the character in the PDF data designates, for one character or one character string, a font name, a font type, an attribution such as italic or bold, and a fixed-width font (non-proportional font) or a proportional font.

There are cases where font information necessary to draw the glyph designated by the operator is incorporated in the PDF data, and where the font information necessary to draw the glyph designated by the operator is not incorporated in the PDF data. It is noted that the font information may be a program for drawing the glyph.

2. When Font Information is Incorporated in PDF Data

When the font information necessary to draw the glyph designated by the operator is incorporated in the PDF data, the controller 11 draws the glyph at a particular position in the image space for one page using the font information incorporated in the PDF data when executing the RIP process. The image space for one page is finally written out as the raster data.

3. When Font Information is not Incorporated in PDF Data

Next, a case where the font information is not incorporated in the PDF data will be described. Firstly, a conventional art will be briefly described with reference to FIGS. 3 and 4.

3-1. Proportional Font

Figure 3A:
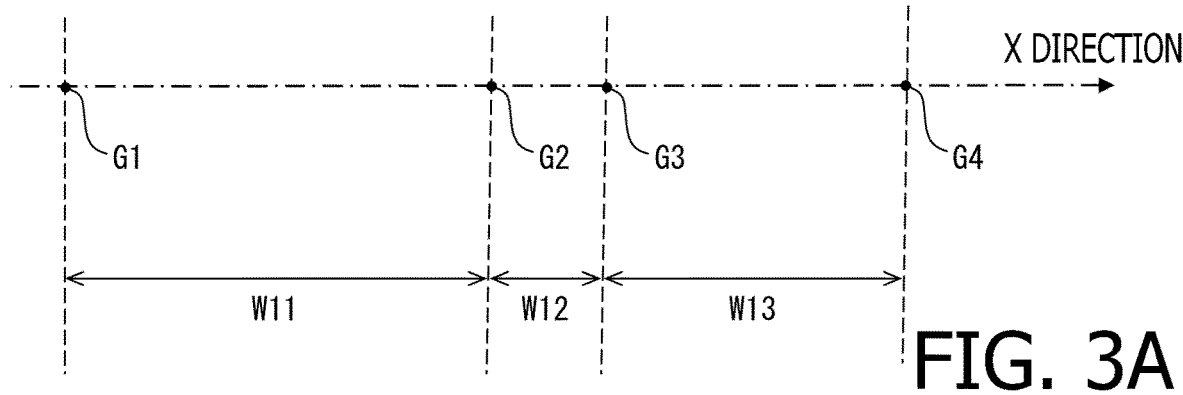
FIGS. 3A-3C show an example when a substitute font is a proportional font according to conventional art.

FIG. 3A schematically shows an example in which an operator in the PDF data designates a proportional font, but the PDF data does not contain font information of the designated proportional font, and controller 11 selects another proportional font as the substitute font. In this example, by analyzing operators included in the PDF data and designating the characters, the glyph origins G1, G2, G3 and G4 are determined. Further, by analyzing the operators included in the PDF data and designating the characters, it is determined that (a) a glyph of a character "A" is drawn within a glyph width W11 between the glyph origins G1 and G2, a glyph of a character "I" is drawn within a glyph width W12 between the glyph origins G2 and G3, and a glyph of a character "B" is drawn within a glyph width W13 between the glyph origins G3 and G4. It is noted that, in the following description, when the glyph widths W11, W12 and W13 are collectively referred to, a term "glyph widths W1" will be used.

When the designated font information is not incorporated in the PDF data, glyphs of the characters "A," "I," and "B" cannot be drawn based only on the PDF data. FIG. 3A shows this state such that the glyphs of the characters "A," "I," and "B" are not shown, but only the glyph width W11, W12 and W13 are indicated as widths for blank spaces.

Figure 3B:
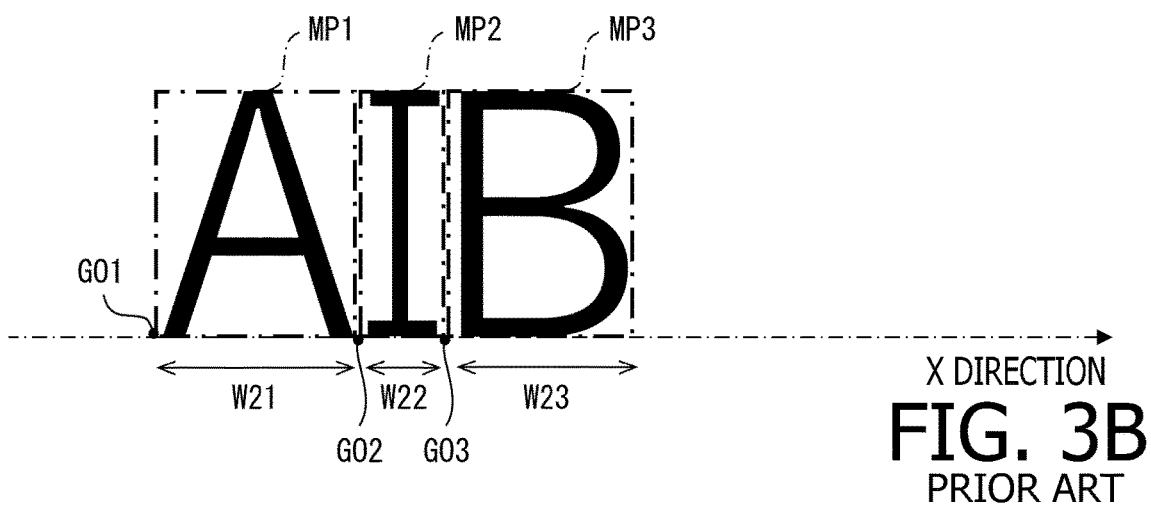

FIG. 3B illustrates an example of glyphs MP1, MP2 and MP3 of a proportional font stored in the font storage 14 as a substitute font. It is noted that when the glyphs MP1, MP2 and MP3 are collectively referred to, a term "glyphs MP" will be used. In FIG. 3B, the glyphs MP1, MP2 and MP3 expressed by the proportional font represent characters "A," "I," and "B," respectively. Regarding the glyph MP of the proportional font, the glyph widths W21, W22 and W23 are different depending on the characters. It is noted that when the glyph widths W21, W22 and W23 are collectively referred to, a term "glyph widths W2" will be used.

The font storage 14 stores glyph information of the proportional font as information of respective character shapes. It is noted that the origins G01, G02 and G03 represent the origins of the glyphs MP1, MP2 and MP3 of the proportional font, respectively.

Figure 3C:
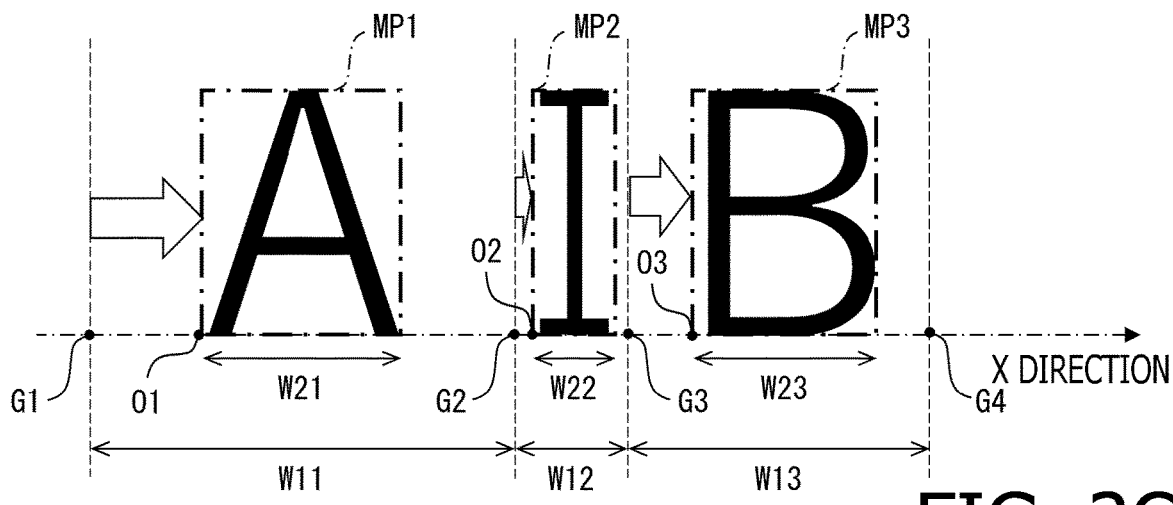

FIG. 3C illustrates a case where the glyphs MP (see FIG. 3B) of the proportional font stored in the font storage 14 are arranged at particular positions in the image space for one page designated by the PDF data.

When the glyph of the character "A," which is the glyph MP1 of the proportional font, is to be drawn within the glyph width W11 between the glyph origins G1 and G2, the controller 11 draws the glyph MP1 expressed by the proportional font in the image space for one page with respect to the origin O1. In this case, the glyph width W11, which is a distance between the glyph origins G1 and G2, is larger than the glyph width W21 of the substitute font. Therefore, the origin O1 is determined in accordance with the following equation.

Origin $O1$=glyph origin $G1$+(glyph width $W11$−glyph width $W21$)/2

It is noted that the origin O1, which is determined based on the above equation, is a position in an X direction with respect to the glyph origin G1.

With regard to the glyph MP2 of the proportional font, since the glyph width W12 is larger than the glyph width W22, similarly to the glyph MP1 of the proportional font, the controller 11 draws the glyph MP2 of the proportional font in the image space for one page with respect to the origin O2. The origin O2 is determined in accordance with the following equation, in a similar way to the origin O1.

Origin $O2$=glyph origin $G2$+(glyph width $W12$−glyph width $W22$)/2

Further, with regard to the glyph MP3 of the proportional font, since the glyph width W13 is larger than the glyph width W23, the controller 11 draws the glyph MP3 of the proportional font in the image space for one page with respect to on the origin O3. The origin O3 is determined in accordance with the following equation.

Origin $O3$=glyph origin $G3$+(glyph width $W13$−glyph width $W23$)/2

If the glyph width W1 is smaller than the glyph width W2, the controller 11 reduce the glyph MP in the X direction so that the glyph width W2 is reduced (hereinafter, such an operation will be described as "reducing the glyph width W2 in the X direction"), before drawing the glyph MP expressed by the proportional font in the image space for one page with respect to the glyph origin G1. Concretely, the controller 11 reduces the glyph width W2 in the X direction so that the reduced glyph width W2 is equal to or less than the glyph width W1. In this case, it is desirable that the controller 11 reduces the glyph width W2 in the X direction so that the reduced glyph width W2 coincides with the glyph width W1.

3-2. Fixed-Width Font

Figure 4A:
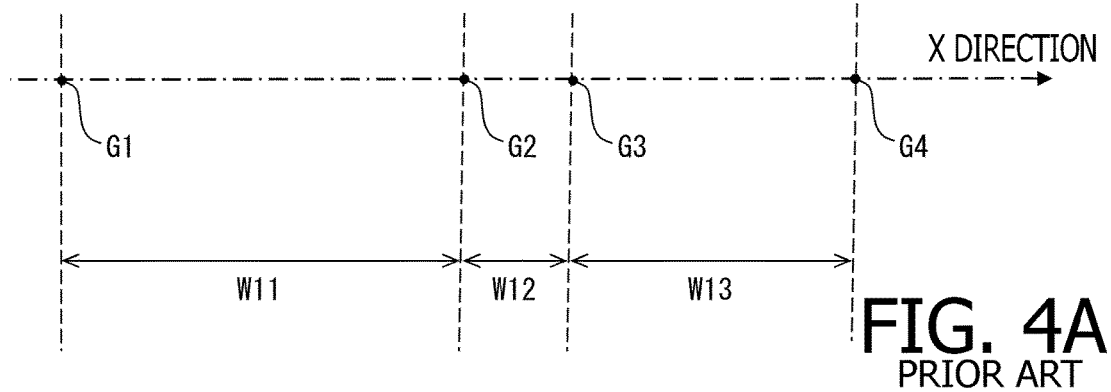
FIGS. 4A-4C show an example when a substitute font is a fixed-width font according to conventional art.
Figure 4B:
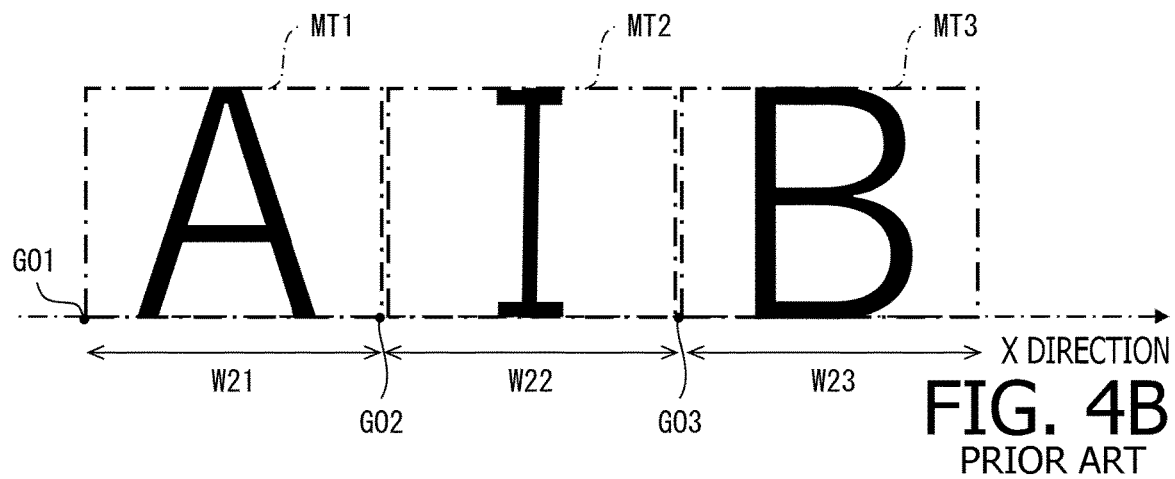
Figure 4C:
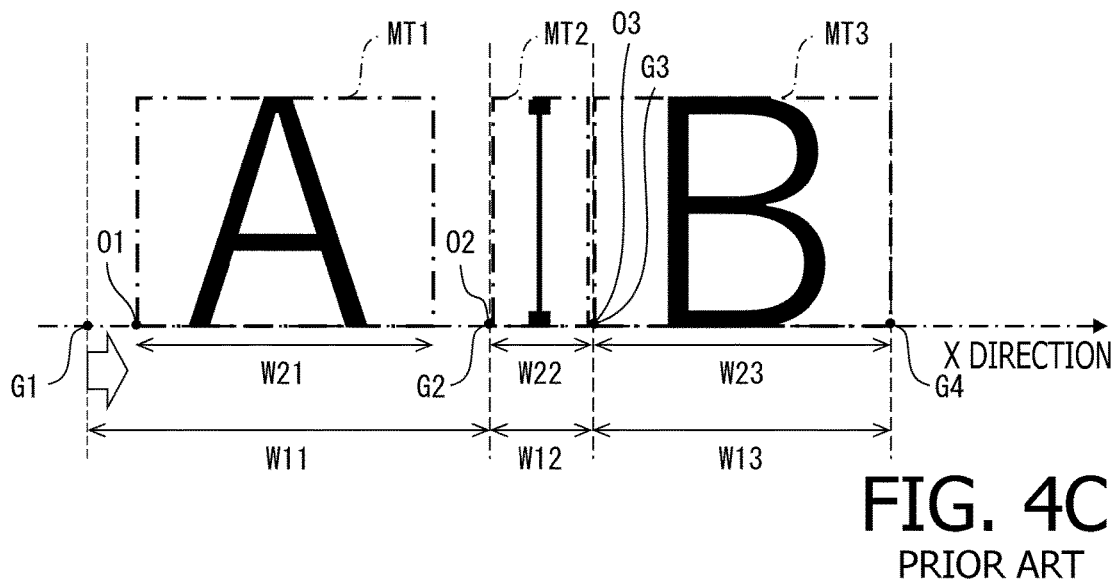

FIG. 4A shows a case where the operator in the PDF data designates a proportional font, but the PDF data does not include the font information of the designated proportional font, and the controller 11 selects a fixed-width font as the substitute font (FIGS. 4B and 4C). The glyph origins G1, G2, G3 and G4 can be determined by analyzing operators included in the PDF data and designating characters. Further, based on the operators included in the PDF data and designating the characters, a glyph of a character "A" is to be drawn within a glyph width W11 between the glyph origins G1 and G2, a glyph of a character "I" is to be drawn within a glyph width W12 between the glyph origins G2 and G3, and a glyph of a character "B" is to be drawn within a glyph width W13 between the glyph origins G3 and G4.

When the PDF data does not include the font information, the glyphs of "A," "I" and "B" cannot be drawn. Therefore, in FIG. 4A, each of the glyph widths W11, W12 and W13 are illustrated as blank areas without drawing the glyphs of the characters "A," "I" and "B."

FIG. 4B illustrates an example of glyphs MT1, MT2 and MT3 of a target character expressed by the fixed-width font stored in the font storage 14 as a substitute font. It is noted that, when collectively referred to, the glyphs MT1, MT2 and MT3 will be referred to as the "glyphs MT of the target character expressed by the fixed-width font." In FIG. 4B, the glyphs MT1, MT2 and MT3 of characters expressed by the fixed-width font represent the characters "A," "I" and "B," respectively. As shown in FIG. 4B, glyph widths W21, W22 and W23 are the same regardless of the characters. It is noted that the origins G01, G02 and G03 represent origins of the glyphs MT1, MT2 and MT3 expressed by the fixed-width font.

FIG. 4C illustrates a case where the glyphs MT of the character expressed by the fixed-width font stored in the font storage 14 (see FIG. 4B) as the substitute font are arranged at particular positions designated by the PDF data in an image space for one page.

When the glyph widths W1 are larger than the glyph widths W2, according to a conventional configuration, a process similar to the process described above using the proportional font as the substitute font is performed even though the glyphs MT of characters expressed by the fixed-width font are used. In the example shown in FIG. 4C, the glyph width W11 is larger than the glyph width W21 with regard to the glyph of the character "A." When the glyph of the character "A" is to be drawn within the glyph width W11, the controller 11 draws the glyph of the character "A" in the image space for one page with respect to the origin O1. The origin O1 is determined in accordance with the following equation.

Origin $O1$=glyph origin $G1$+(glyph width $W11$−glyph width $W21$)/2

It is noted that the origin O1 in the above equation is a position of the origin O1 in the X direction with respect to the glyph origin G1.

In the example shown in FIG. 4C, the glyph width W13 is also larger than the glyph width W23 with regard to the glyph of the character "B." Therefore, according to the conventional configuration, the controller 11 draws the glyph of the character "B" similarly as the glyph of the character "A" is drawn.

Meanwhile, regarding the glyph of the character "I," in the example of FIG. 4C, the glyph width W12 is smaller than the glyph width W22. In this case, according to the conventional configuration, the process similar to the process using the proportional font as the substitute font is performed when the substitute font is the fixed-width font. The controller 11 reduces the glyph width W22 in the X direction, and the controller 11 draws the glyph of the character "I" in the image space for one page with respect to the glyph origin G1.

Regarding the glyph MT2 of the character "I" expressed by the fixed-width font, sine the width of the glyph is small, spaces are added around the glyph so that a glyph width of the character "I" have the glyph width W22 which is the same glyph width of the other characters (e.g., "W") expressed by the fixed-width font. According to the conventional configuration, the controller 11 draws the glyph of character "I" in the image space for one page by reducing the glyph width W22 in the X direction so that the reduced glyph width W22 is equal to or less than the glyph width W12.

FIG. 4C shows a state where the character "I" is reduced in the x-direction excessively due to the blank spaces around the glyph of character "I" expressed by the fixed-width font. When the printing device 16 of the printer 1 performs a printing process to print the raster image created in the RIP process on the printing sheet as shown in FIG. 4C, the characters for which the fixed-width font is used as the substitute font are printed, by the printing device 16, unnaturally (e.g., in a manner reduced excessively).

Figure 5:
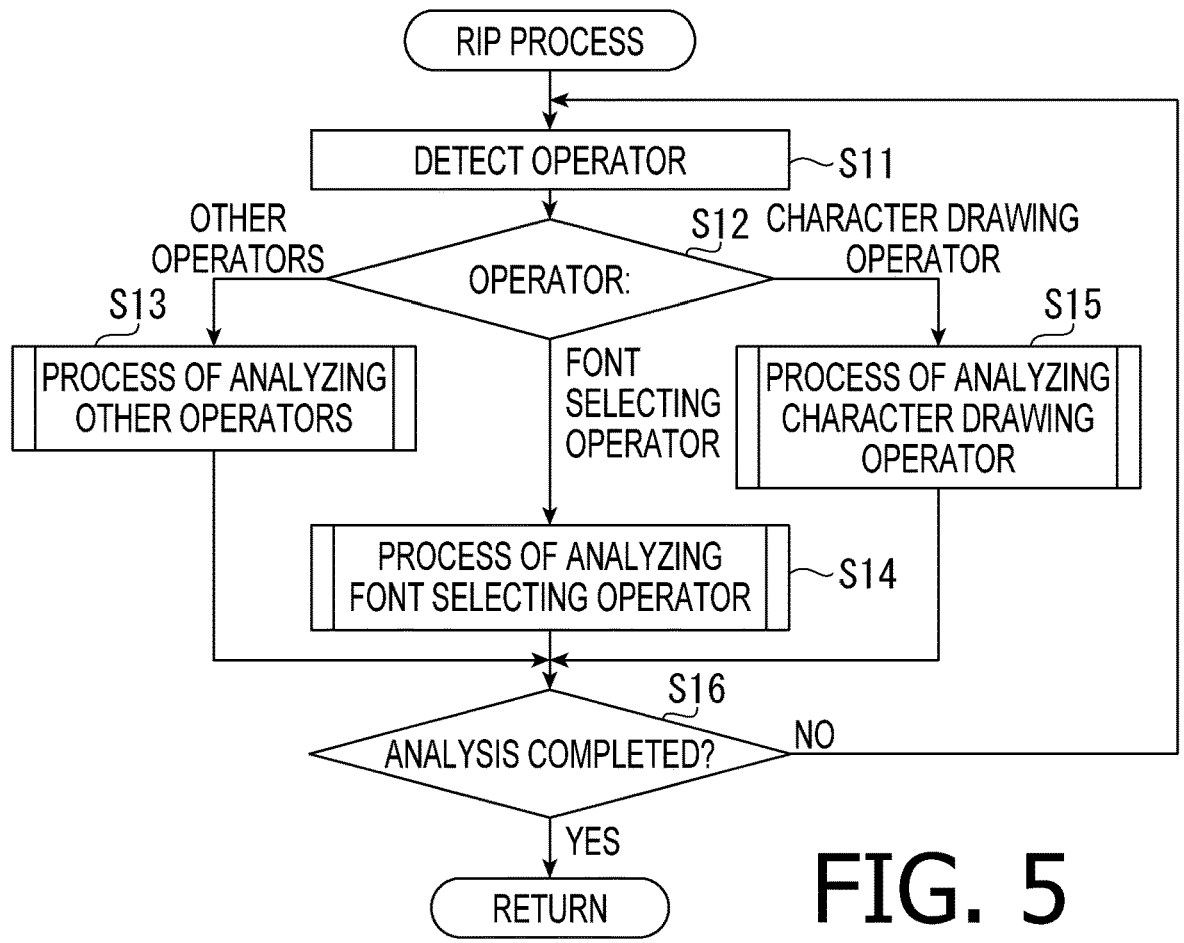
FIG. 5 shows a flowchart illustrating a RIP process performed by the printer shown in FIG. 1.
Figure 6:
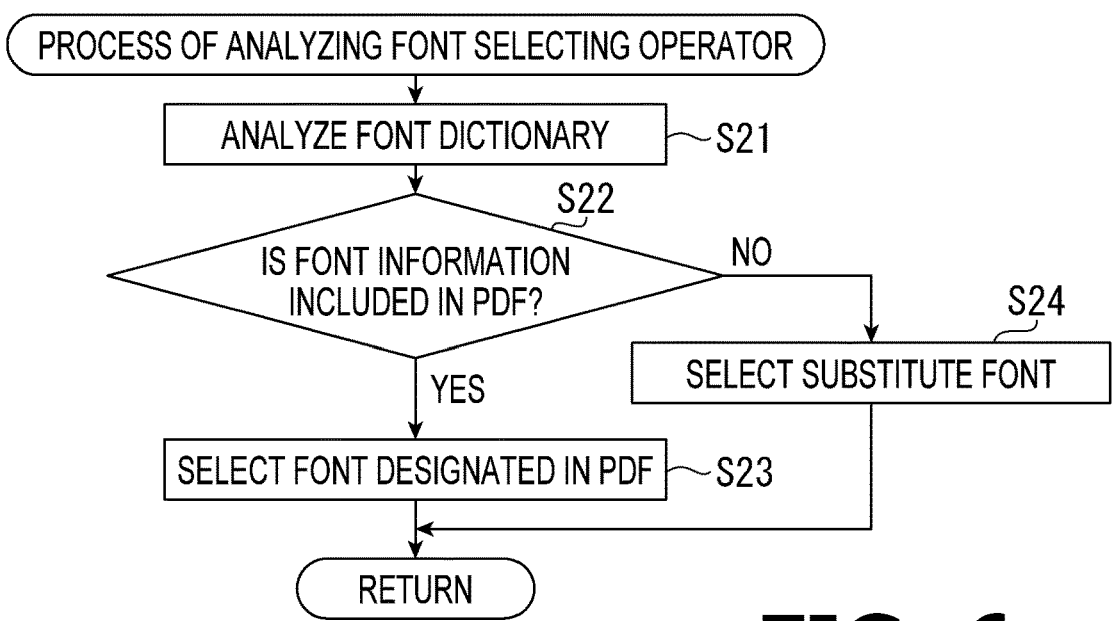
FIG. 6 shows a flowchart illustrating an analyzing process to analyze a font selecting operator.
Figure 7:
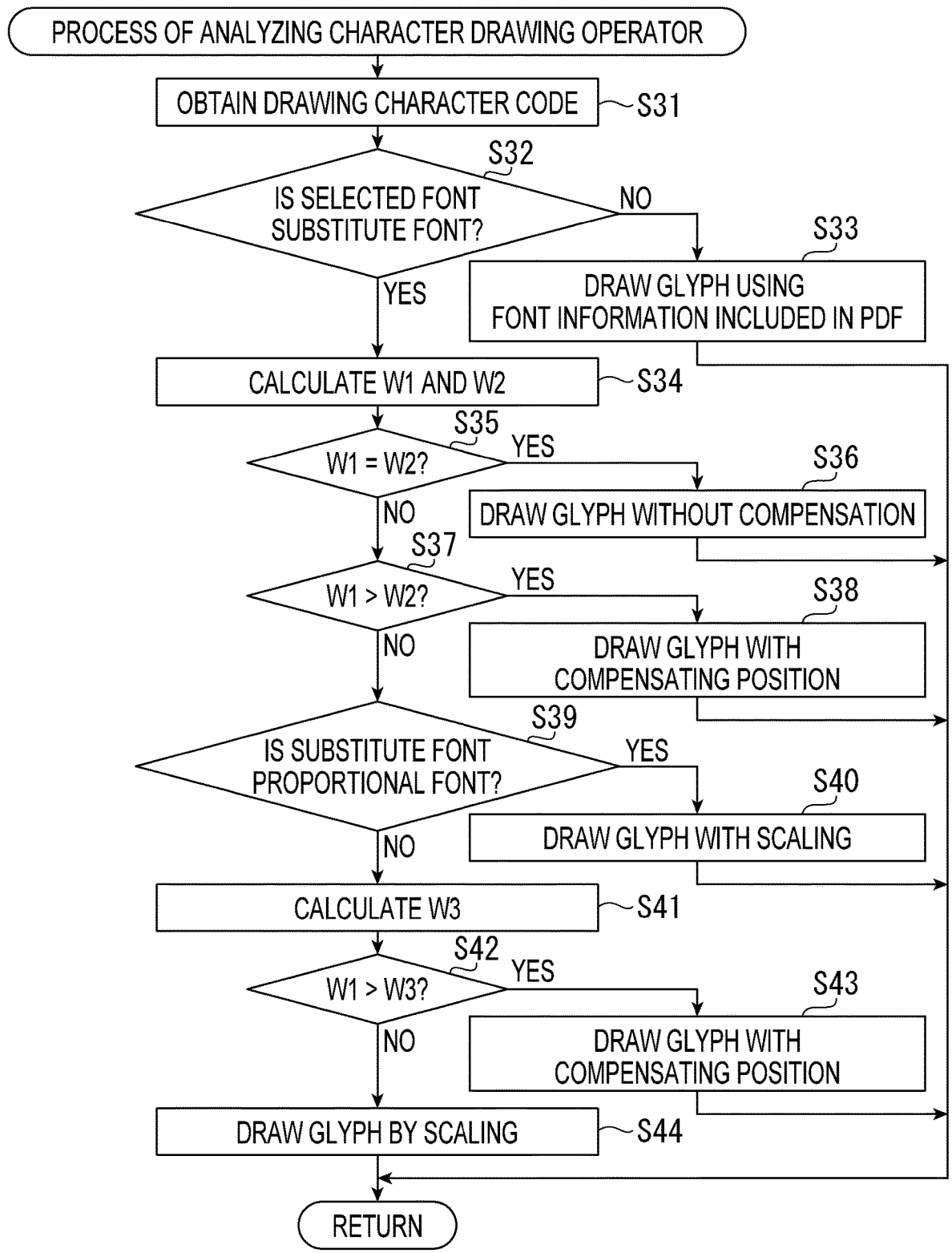
FIG. 7 shows a flowchart illustrating an analyzing process to analyze a character drawing operator.

In order to decrease the possibility of such an excessive reduction of the character "I" as shown in the example of character "I" in FIG. 4C according to the conventional art, the controller 11 according to the present embodiment performs the RIP process shown in FIGS. 5, 6 and 7. It is noted that the character "I" for which the fixed-width font is selected as the substitute font is an example of the target character.

4. Operation of Printer

FIG. 5 is a flowchart illustrating the RIP process, FIG. 6 is a flowchart illustrating the process of analyzing the font selecting operator, and FIG. 7 is a flowchart illustrating the process of analyzing the character drawing operator, which are performed by the controller 11.

When the printer 1 prints the PDF data received from the external device 2, the controller 11 performs the RIP process shown in FIG. 5. The RIP process includes the process of analyzing the font selecting operator shown in FIG. 6, the process of analyzing the character drawing operator shown in FIG. 7, and processes of analyzing other operators. The controller 11 converts the PDF data to the printable raster data by performing the above processes.

4-1. RIP Process

In the RIP process, the controller 11 performs the process of analyzing the operators as shown in FIG. 5.

The PDF data includes multiple operators such as operators designating images, graphics such as a circle and a square, and/or operators describing texts. The controller 11 starts the RIP process to sequentially detect the operators constituting the PDF data from among multiple operators (S11).

The operators include the character drawing operator, the font selecting operator, and other operators. It is noted that the other operators are the operators designating drawing objects of the images, graphics such as a circle and a square, and perform operations of temporarily writing the drawing objects of the images, graphics such as a circle and a square in a storage of a work area (not shown).

When the detected operator is one of the other operators (S12: "OTHER"), the controller 11 performs the analyzing process of the detected one of the other operators (S13). When the detected operator is the font selecting operator (S12: "FONT SELECTING OPERATOR"), the controller 11 performs the process of analyzing the font selecting operator (S14). When the detected operator is the character drawing operator (S12: "CHARACTER DRAWING OPERATOR"), the controller 11 performs the process of analyzing the character drawing operator (S15). According to the present embodiment, the controller 11 performs the process of analyzing the font selecting operator (FIG. 6) and the process of analyzing the character drawing operator (FIG. 7) in this order.

When the controller 11 completes the analyzing processes of all of the operators of the PDF data (S16: YES), the controller 11 combines the drawing objects of the images, graphics and/or the characters which have been stored, for all the operators, in the storage of the work area (not shown) as the image space for one page, and stores the combined data in the storage (not shown) as the raster data. Then, the controller 11 terminates the RIP process. Until the processes for analyzing all the operators included in the PDF data are completed (S16: NO), the controller 11 repeats S11 to S15.

4-2. Process of Analyzing Font Selecting Operator

As shown in FIG. 6, when the operator is the font selecting operator, the controller 11 analyzes a font dictionary included in the PDF data (S21) and determines whether the font information corresponding to the font designated by the font selecting operator is included in the PDF data (S22). When the font information is included in the PDF data (S22: YES), the controller 11 selects the font information designated by the font selecting operator (S23). When the font information is not included in the PDF data (S22: NO), the controller 11 selects the substitute font stored in the font storage 14 (S24). In this case, the controller 11 selects one of the substitute fonts, i.e., one of the fixed-width font and the proportional font, based on a condition of glyphs (e.g., character shapes) or the like.

4-3. Process of Analyzing Character Drawing Operator

In the following description, the glyph width of the glyph designated in the PDF data is referred to as "designated glyph width W1," the glyph width of the glyph drawn by using the substitute font is referred to as "drawing glyph width W2," and the width of the bounding box of the glyph drawn by using the substitute font is referred to as "Bounding box Width W3." When the selected font for drawing characters is the substitute font, the drawing glyph width W2 is a width assigned to a target character, or the width of the character when the substitute font is used.

As shown in FIG. 7, the analyzing process of the character drawing operator varies depending on whether the font used for drawing a target PDF data selected in the analyzing process of the font selecting operator is a font corresponding to the font information of the target PDF data or the substitute font.

In the analyzing process of the character drawing operator, the controller 11 obtains the drawing character code (S31). When the selected font is not the substitute font (S32: NO), i.e., when the selected font is the font corresponding to the font information of the target PDF data, the controller 11 draws, using the font information, the glyph indicated by the drawing character code in the storage of the work area (not shown) as usual (S33), and terminates the process.

On the other hand, when the selected font is the substitute font (i.e., the fixed-width font or the proportional font) (S32: YES), the controller 11 calculates the designated glyph width W1 and the drawing glyph width W2 (S34). Regarding data representing the designated glyph width W1, the controller 11 analyzes the dictionary included in the PDF data, and obtains data corresponding to the drawing character code from the dictionary included in the PDF data. Regarding the drawing glyph width W2, the controller 11 obtains a glyph width of the designated one of substitute fonts the font storage 14 stores and corresponding to a character designated by the drawing character code. In this case, the drawing glyph width W2 is a width assigned to the designated substitute font corresponding to the character. When the substitute font is the fixed-width font, the drawing glyph width W2 has a fixed width, while, when the substitute font is the proportional font, the drawing glyph width W2 has a different width assigned to each character.

Next, the controller 11 compares the designated glyph width W1 with the drawing glyph width W2 (S35). When the designated glyph width W1 is equal to the drawing glyph width W2 (S35: YES), the controller 11 draws the glyph designated by the drawing character code in the storage of the work area (not shown) without compensating the substitute font (S36), and terminates the process. That is, in step S36, the controller 11 arranges the target character in the designated substitute font such that the drawing glyph width W2 coincides with the designated glyph width W1.

When the controller 11 compares the designated glyph width W1 with the drawing glyph width W2, and if the designated glyph width W1 is not equal to the drawing glyph width W2 (S35: NO), but the designated glyph width W1 is larger than the drawing glyph width W2 (S37: YES), the controller 11 performs a position compensating process to compensate the position of the target character in the substitute font, draws the glyph indicated by the drawing character code (S38), and terminates the process.

Figure 8A:
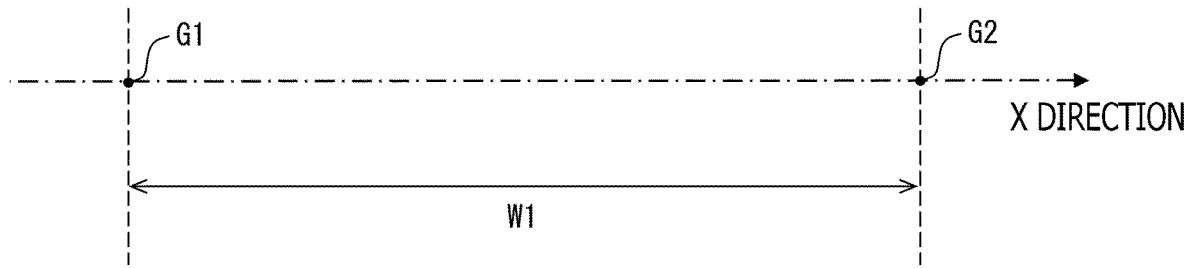
FIGS. 8A-8C show an example of a position compensating process performed in the analyzing process shown in FIG. 7.
Figure 8B:
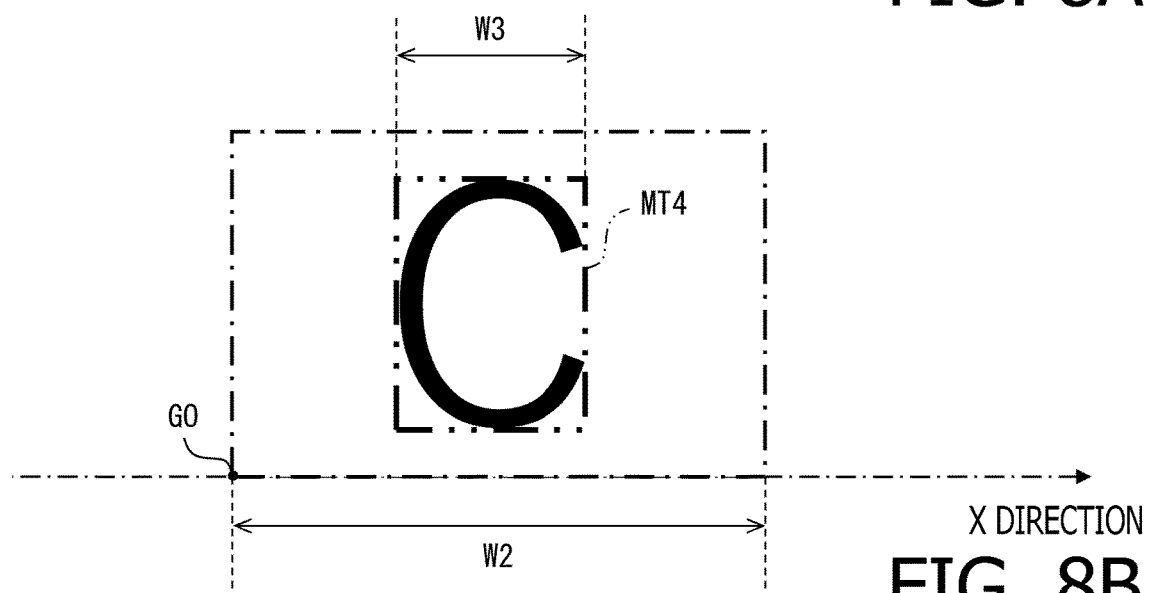
Figure 8C:
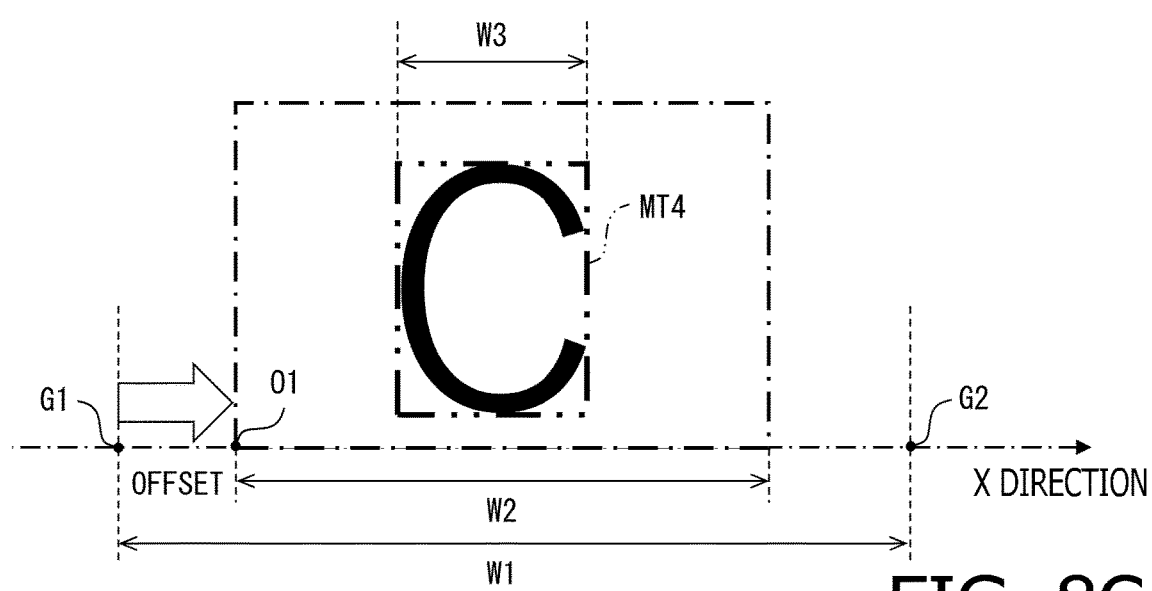

FIGS. 8A-8C illustrate an example of the position compensating process (S38) which is performed by the controller 11 when the designated glyph width W1 is larger than the drawing glyph width W2. FIG. 8A schematically shows a case where the operator included in the PDF data designates the fixed-width font, but the PDF data does not have include the font information of the fixed-width font. The process illustrated in FIG. 8A is similar to that in a case where the glyph width W1 is larger than the glyph width W2 shown in FIGS. 3 and 4.

As shown in FIG. 8A, the glyph origin G1 and the glyph origin G2 are defined by the PDF data. Further, an operator designating a character included in the PDF data designates that a glyph of a character "C" is to be drawn within the designated glyph width W1. When the font information is not included in the PDF data, the controller 11 cannot draw the glyph of the character "C," the designated glyph width W1 is illustrated as a blank space without drawing the glyph of character "C" in FIG. 8A, similarly to cases shown in FIGS. 3A and 4A.

FIG. 8B illustrates an example of a glyph MT4 of a character expressed by the fixed-width font stored in the font storage 14 as the substitute font. In FIG. 8B, the glyph MT4 shows the character "C" expressed by the fixed-width font.

FIG. 8C schematically illustrates a case where the glyph MT4 of the character "C" expressed by the fixed-width font stored in the font storage 14 as the substitute font (see FIG. 8B) is drawn at a particular position in the image space for one page designated by the PDF data.

Returning to FIG. 7, when the glyph of character "C" is to be drawn within the designated glyph width W1, the controller 11 draws, in S38, the glyph of character "C" in the image space for one page with respect to the origin O1. At this stage, since the designated glyph width W1 is larger than the drawing glyph width W2, a position of the origin O1 is determined in accordance with the equation below.

$$\text{Origin } O1 = \text{Glyph Origin } G1 + (\text{designated glyph width } W1 - \text{drawing glyph width } W2)/2$$

In this way, the controller 11 performs the position compensating process.

It is noted that the same process is performed in the position compensating process (S38) regardless of whether the substitute font is the fixed-width font or the proportional font since the designated glyph width W1 is larger than the drawing glyph width W2.

It is noted that, when the determination in S35 is "YES" and when the determination in S37 is "YES," it is unnecessary for the controller 11 to calculate the bounding box width W3 of the glyph of the character "C" in S41. Therefore, in such a case, the controller 11 can perform the RIP process quickly to the extent that it is no longer necessary to calculate the bounding box width W3. It is noted that each of the cases where the determination in S35 is "YES" and the case where the determination in S37 is "YES" is included in a case where the designated glyph width W1 is equal to or larger than the drawing glyph width W2.

When the designated glyph width W1 is not larger than the drawing glyph width W2 (S37: NO) and the substitute font to be used is the proportional font (S39: YES), the controller 11 performs a scaling process described below and draws the glyph indicated by the drawing character code (S40), and terminates the process.

In the scaling process in S40, the controller 11 reduces the drawing glyph width W2 in the X direction so that the drawing glyph width W2 is equal to or smaller than the designated glyph width W1 (i.e., a character having the drawing glyph width W2 is reduced in the X direction so that the reduced drawing glyph width W2 is equal to or less than the designated glyph width W1), thereby the character being drawn in the image space for one page.

When the substitute font to be used is not the proportional font but the fixed-width font (S39: NO), the controller 11 calculates the bounding box width W3 of the glyph of the character expressed by the fixed-width font (S41).

Next, the controller 11 compares the designated glyph width W1 with the bounding box width W3. When the designated glyph width W1 is larger than the bounding box width W3 (S42: YES), the controller 11 performs the position compensating process to compensate the position of the glyph expressed by the fixed-width font, draws the glyph indicated by the drawing character code (S43), and terminates the process.

Figure 9A:
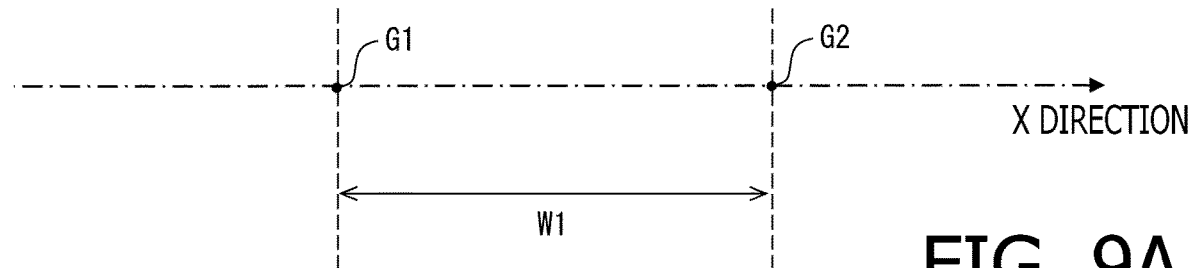
FIGS. 9A-9C show an example of a position compensating process performed in the analyzing process shown in FIG. 7.
Figure 9B:
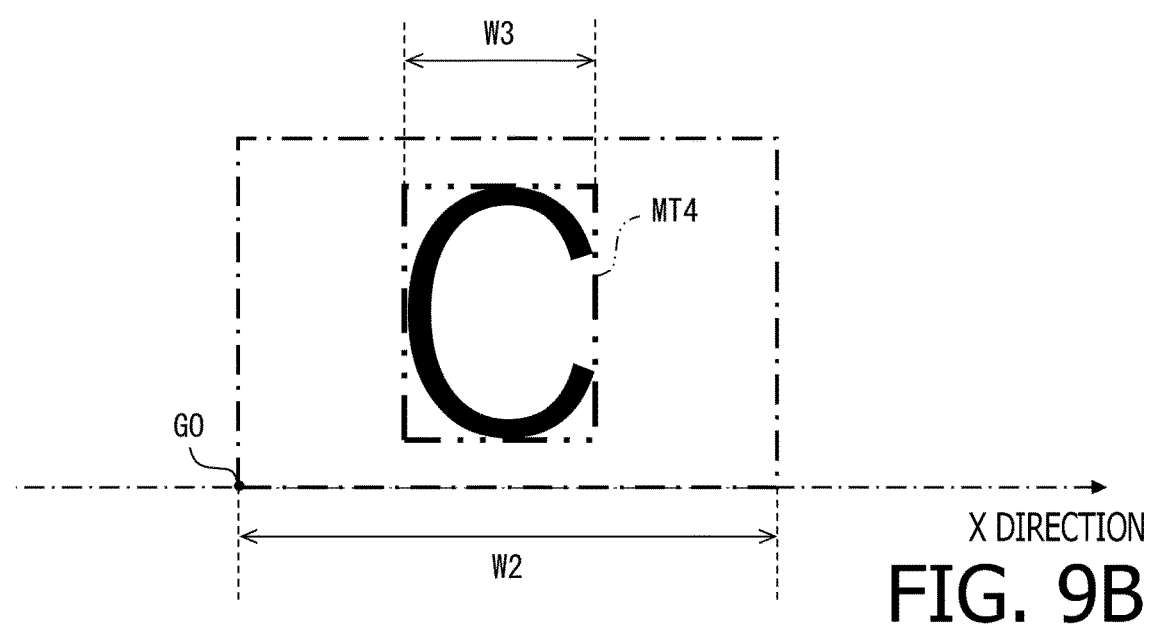
Figure 9C:
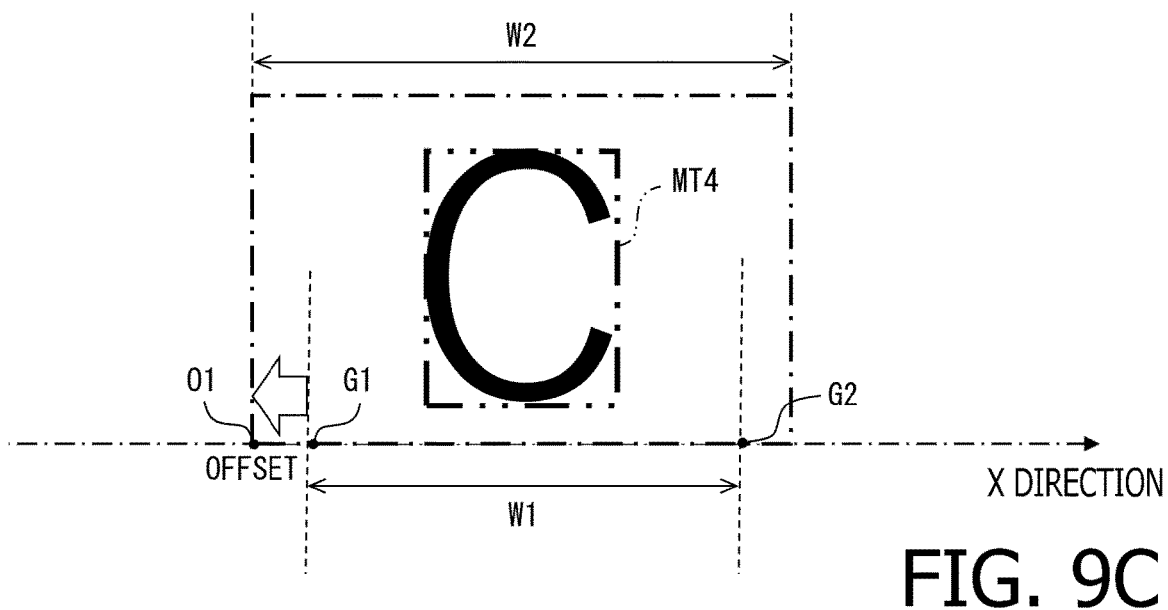

FIGS. 9A-9C illustrate the position compensating process (S43) performed by the controller 11 when the substitute font is the fixed-width font and the designated glyph width W1 is larger than the bounding box width W3.

FIG. 9B illustrates an example of the glyph MT4 expressed by the fixed-width font stored as the substitute font in the font storage 14. In FIG. 9B, the glyph MT4 expressed by the fixed-width font indicates the character "C." Comparing FIG. 9A with FIG. 9B, it is understood that the designated glyph width W1 is smaller than the drawing glyph width W2. Therefore, when the position compensating process shown in FIG. 4C is performed, the width of the character "C" is reduced excessively. More concretely, when the drawing glyph width W2 is reduced in the X direction so that the character "C" having the drawing glyph width W2 is arranged within the designated glyph width W1, the character "C" is reduced excessively due to the blank spaces around the glyph of the character "C."

Returning to S43, the controller 11 draws the glyph of the character "C," which is the glyph MT4 expressed by the fixed-width font within the designated glyph width W1. Concretely, the controller 11 draws the glyph of the character "C," which is the glyph MT4 expressed by the fixed-width font, in the image space for one page with respect to the origin O1 (S43).

In this case, a position of the origin O1 is determined in accordance with the following equation:

$$\text{Origin } O1 = \text{glyph origin } G1 + (\text{designated glyph width } W1 - \text{drawing glyph width } W2)/2$$

The position of the origin O1 is an offset position which is offset from the glyph origin G1 in a direction opposite to the X direction. In this case, a part of the drawing glyph width W2 overlaps a part of the designated glyph width of an adjacent glyph on the glyph origin G1 side viewed from the character "C." Further, a part of the drawing glyph width W2 also overlaps a part of the designated glyph width of an adjacent glyph on the glyph origin G2 side viewed from the character "C." It is noted that the drawing glyph width W2 and the designated glyph width of an adjacent glyph on the glyph origin G1 side viewed from the character "C" overlap by the above-described offset amount.

In the position compensating process in S43, the controller 11 arranges the character "C" such that a center of the designated glyph width W1 coincides with a center of the drawing glyph width W2, as a consequence. Since the designated glyph width W1 is larger than the bounding box width W3, it is unnecessary to reduce the character width of the character "C" in the position compensating process in S43.

When the designated glyph width W1 is equal to or smaller than the bounding box width W3 (S42: NO), it is necessary to reduce the character width of the character "C" and therefore the controller 11 performs the scaling process below, then draws the glyph (S44) and terminates the process.

Figure 10A:
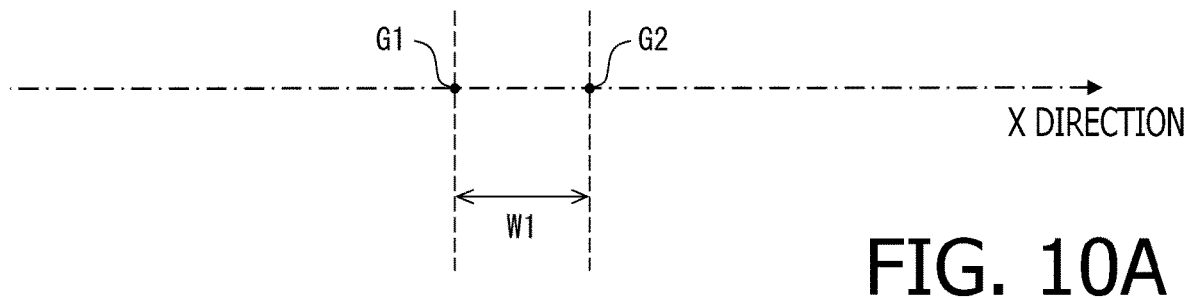
FIGS. 10A-10C show an example of a scaling process performed in the analyzing process shown in FIG. 7.
Figure 10B:
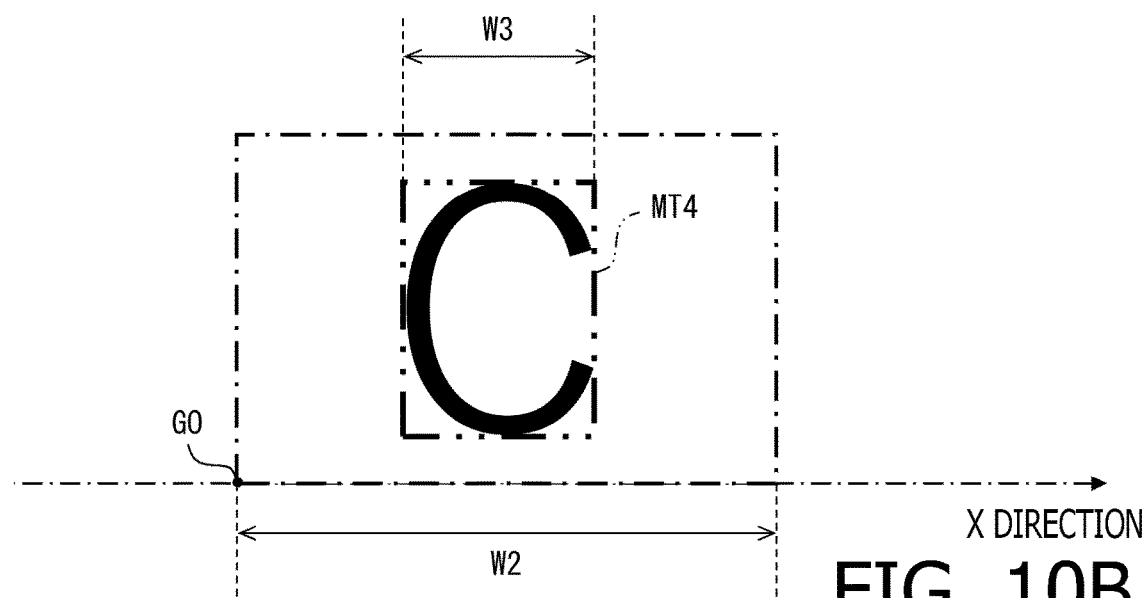
Figure 10C:
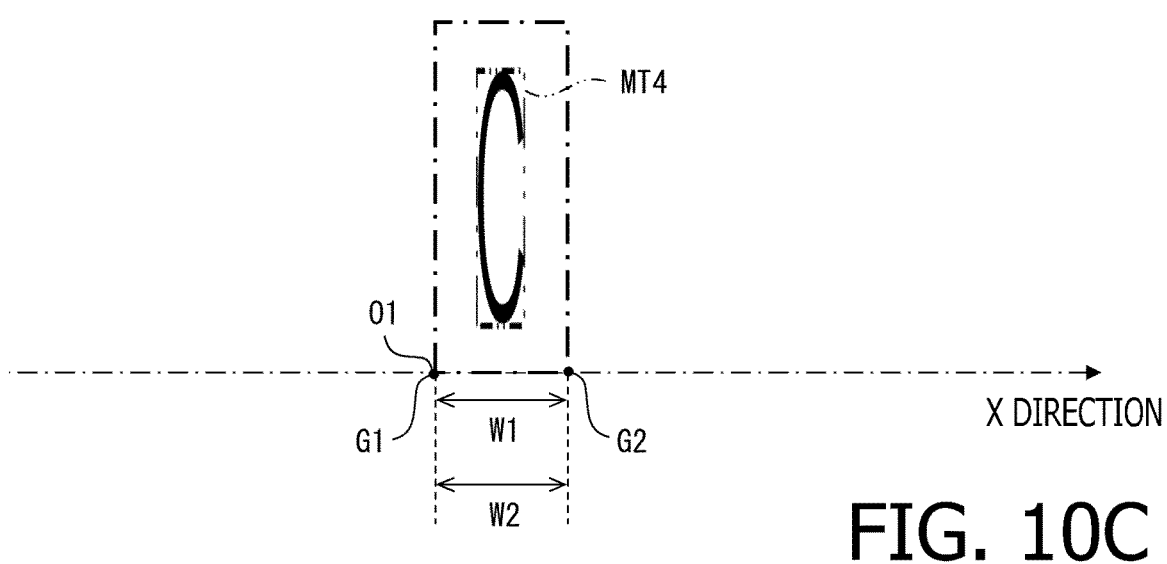

FIGS. 10A-10C illustrate the scaling process (S44) performed by the controller 11 when the substitute font is the fixed-width font and the designated glyph width W1 is equal to or smaller than the bounding box width W3. FIG. 10A shows a case where an operator included in the PDF data designates the fixed-width font, but the PDF data does not include the font information of the fixed-width font.

As shown in FIG. 10A, the glyph origin G1 and the glyph origin G2 are defined by the PDF data. Further, by the operator designating the character in the PDF data, it is defined that a glyph of the character "C" is drawn within the designated glyph width W1. When the font information is not included in the PDF data, the glyph of the character "C" cannot be drawn. Therefore, the designated glyph width W1 is expressed as a blank space without drawing the glyph of character "C" in FIG. 10A, as is described referring to the examples shown in FIGS. 3A and 4A.

FIG. 10B illustrates an example of a fixed-width font stored in the font storage 14 as the substitute font. FIG. 10B shows the character "C" expressed by the fixed-width font.

FIG. 10C schematically illustrates a case where the glyph of character "C" expressed by the fixed-width font stored in the font storage 14 as the substitute font shown in FIG. 10B is arranged, in FIG. 10A, at a particular position in an image space for one page designated by the PDF data.

In the scaling process in S44, the controller 11 reduces the drawing glyph width W2 in the X direction so that the character "C" having the drawing glyph width W2 is arranged within the designated glyph width W1, and draws the reduced glyph in the image space for one page. According to an example shown in FIG. 10C, the controller 11 reduces the drawing glyph width W2 so that the reduced drawing glyph width W2 coincides with the designated glyph width W1.

In the above-described process of the controller 11, for the same characters that have been processed once, the previous process is applied to the same characters, and the controller does not perform the same process again.

In addition, the printer 1 may be connected to a server, and the above-described processes performed by the controller 11 of the printer 1 may be performed by the server. In such a case, the printer 1 sends the input PDF data to the server, and the printer 1 receives, from the server, a result of the process which is equivalent to the process the controller 11 would apply to the input PDF data, and performs the printing.

5. Example of Software Implementation

A control block of the printer 1 (especially the controller 11) can also be achieved by a logic circuit (hardware) incorporated in an integrated circuit (i.e., an IC) or by software.

In the latter case (i.e., by software), the printer 1 may include a computer configured to executes programs realizing respective functions. The computer includes, for example, one or more processors and a non-transitory computer-readable recording medium storing the programs. As the processor(s) reads out the programs from the recording medium and executes the same, the desired function(s) is achieved. As the processor(s), a CPU may be used. As the "non-transitory and tangible medium" medium such as a ROM, a tape, a disk, a recording card, a semiconductor memory, a programmable logic circuit and the like may be used. A RAM for developing the programs may further be provided. It is noted that the program(s) may be provided to the computer via an arbitrary transmission medium capable of transmitting the program(s) (e.g., a communication network or a broadcasting wave). According to aspects of the present disclosures, the programs may be realized electrically (e.g., in the form of a data signal incorporated into a carrier wave).

It is noted that the above-mentioned configurations do not need to be limited to the above-described examples. The above-mentioned configurations can be modified in various ways without departing from aspects of the present disclosures. It is also possible that technical features disclosed above in different embodiments and modifications may be suitably combined. Such combinations are also included within aspects of the present disclosures.

What is claimed is:

1. A printing apparatus, comprising:
   a controller configured to perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data;
   a printing device configured to print an image based on the raster data; and
   a storage device configured to store fixed-width font information in which a fixed width is assigned to each character,
   wherein, when the fixed-width font is determined to be used as a substitute font for the target character and when the glyph width of the target character is smaller than the fixed width and the glyph width of the target character is larger than the width of the bounding box of the glyph of the target character expressed by the fixed-width font, the controller is further configured to arrange, in the RIP process, the target character expressed by the fixed-width font such that the width of the bounding box is arranged within the glyph width.

2. The printing apparatus according to claim 1, wherein the fixed-width font is determined to be used as the substitute font when the font data is not included in the print data.

3. The printing apparatus according to claim 1, wherein, when a glyph width of the target character is smaller than the fixed width and the glyph width is equal to or smaller than a width of a bounding box of a glyph of the target character expressed by the fixed-width font, the controller is further configured to arrange, in the RIP process, the target character expressed by the fixed-width font in a reduced manner such that the reduced fixed width coincides with the glyph width.

4. The printing apparatus according to claim 1, wherein the controller is further configured to arrange the target character expressed by the fixed-width font so that the glyph width of the target character expressed by the fixed-width font is arranged within the glyph width when the glyph width of the target character is equal to or larger than the fixed width.

5. The printing apparatus according to claim 1, wherein the storage device further stores proportional font information in which different widths are assigned to respective characters; and
   wherein, when the proportional font is determined to be used as a font for the target character in the RIP process, the controller is further configured to
      arrange the target character expressed by the proportional font such that the width of the target character expressed by the proportional font is arranged within the glyph width when the glyph width of the target character is equal to or larger than the width of the target character expressed by the proportional font, and
      arrange the target character expressed by the proportional font in a reduced manner such that a reduced width of the target character expressed by the proportional font is arranged within the glyph width when the glyph width of the target character is smaller than the width of the target character expressed by the proportional font.

6. The printing apparatus according to claim 5, wherein the fixed-width font is determined to be used as the substitute font when the font data is not included in the print data.

7. The printing apparatus according to claim 5, wherein, when the font information for the target character is not included in the print data, and when one of the fixed-width font and the proportional font is determined to be used as a font for the target character in the RIP process, the controller is further configured to arrange the target character expressed by the determined one of the fixed-width font and the proportional font so that the width of the target character expressed by the determined one of the fixed-width font and the proportional font coincides with the glyph width when the glyph width of the target character is equal to a width of the target character expressed by the determined one of the fixed-width font and the proportional font.

8. The printing apparatus according to claim 1, wherein the controller is configured to, in the RIP process, arrange the target character expressed by the fixed-width font such that the width of the bounding box is within the glyph width and a center of the glyph width coincides with a center of the fixed width when the glyph width of the target character is smaller than the fixed width, and the glyph width is larger than a bounding box width of a glyph of the target character expressed by the fixed-width font.

9. A printing apparatus, comprising:
  a controller configured to perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data;
  a printing device configured to print an image based on the raster data; and
  a storage device configured to store fixed-width font information in which a fixed width is assigned to each character and a proportional font in which different widths are assigned to respective characters,
  wherein, when one of the fixed-width font and the proportional font is determined to be used as a substitute font for the target character, the controller is further configured to perform, in the RIP process
    arranging the target character expressed by the determined one of the fixed-width font and the proportional font so that the width of the target character expressed by the determined one of the fixed-width font and the proportional font coincides with the glyph width when the glyph width of the target character is equal to a width of the target character expressed by the determined one of the fixed-width font and the proportional font,
    arranging the target character expressed by the determined one of the fixed-width font and the proportional font such that the width of the target character expressed by the determined one of the fixed-width font and the proportional font is within the glyph width when the glyph width of the target character is larger than the width of the target character expressed by the determined one of the fixed-width font and the proportional font,
    arranging the target character expressed by the proportional font in a reduced manner so that a reduced width of the target character expressed by the proportional font is within the glyph width when the glyph width of the target character is smaller than the width of the target character expressed by the determined one of the fixed-width font and the proportional font, and the determined one of the fixed-width font and the proportional font is the proportional font,
    arranging the target character expressed by the fixed-width font in a reduced manner so that the reduced fixed width of the target character coincides with the glyph width when the glyph width of the target character is smaller than the width of the target character expressed by the determined one of the fixed-width font and the proportional font, the determined one of the fixed-width font and the proportional font is the fixed-width font, and the glyph width of the target character is equal to or smaller than a width of a bounding box of the glyph of the target character expressed in the fixed-width font, and
    arranging the target character expressed by the fixed-width font so that the width of the bounding box is within the glyph width when the glyph width of the target character is smaller than the width of the target character expressed by the determined one of the fixed-width font and the proportional font, the determined one of the fixed-width font and the proportional font is the fixed-width font, and the glyph width of the target character is larger than the width of the bounding box of the glyph of the target character expressed in the fixed-width font.

10. The printing apparatus according to claim 9, wherein the fixed-width font is determined to be used as the substitute font when the font data is not included in the print data.

11. The printing apparatus according to claim 10, wherein the controller is configured to, in the RIP process, arrange the target character expressed by the fixed-width font such that the width of the bounding box is within the glyph width and a center of the glyph width coincides with a center of the fixed width when the glyph width of the target character is smaller than the fixed width, and the glyph width is larger than a bounding box width of a glyph of the target character expressed by the fixed-width font.

12. A printing method, comprising:
  performing a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data; and
  printing an image based on the raster data,
  wherein, when a fixed-width font is determined to be used as a substitute font for the target character and when the glyph width of the target character is smaller than the fixed width and the glyph width of the target character is larger than the width of the bounding box of the glyph of the target character expressed by the fixed-width font, the method further comprises arranging the target character expressed by the fixed-width font such that the width of the bounding box is arranged within the glyph width.

13. The printing method according to claim 12, wherein the fixed-width font is determined to be used as the substitute font when the font data is not included in the print data.

14. The printing method according to claim 12, wherein, when a glyph width of the target character is smaller than the fixed width and the glyph width is equal to or smaller than a width of a bounding box of a glyph of the target character expressed by the fixed-width font, the method further includes arranging, in the RIP process, the target character expressed by the fixed-width font in a reduced manner such that the reduced fixed width coincides with the glyph width.

15. The printing method according to claim 14, wherein the method further comprises arranging the target character expressed by the fixed-width font such that the glyph width of the target character expressed by the fixed-width font is arranged within the glyph width when the glyph width of the target character is equal to or larger than the fixed width.

16. A non-transitory computer-readable recording medium for a printing apparatus having a controller, the recording medium storing computer-executable instructions which cause, when executed by the controller, the printing apparatus to:

perform a RIP process of analyzing print data and create raster data based on print data, the print data being configured such that a target character and a glyph width for each character are described in a page description language, the glyph width being defined as a distance between an origin of the target character and an origin of a character next to the target character, the target character being arranged within the glyph width designated by the print data in creating the raster data; and print an image based on the raster data, wherein, when a fixed-width font is determined to be used as a substitute font for the target character and when the glyph width of the target character is smaller than the fixed width and the glyph width of the target character is larger than the width of the bounding box of the glyph of the target character expressed by the fixed-width font, the instructions further causes, when executed by the controller, the printing apparatus to arrange the target character expressed by the fixed-width font such that the width of the bounding box is arranged within the glyph width.

17. The non-transitory computer-readable recording medium according to claim 16, wherein the fixed-width font is determined to be used as the substitute font when the font data is not included in the print data.

18. The non-transitory computer-readable recording medium according to claim 16, wherein, when executed by the controller, the instructions further cause the printing apparatus to arrange, in the RIP process, the target character expressed by the fixed-width font in a reduced manner such that the reduced fixed width coincides with the glyph width when a glyph width of the target character is smaller than the fixed width and the glyph width is equal to or smaller than a width of a bounding box of a glyph of the target character expressed by the fixed-width font.

* * * * *